March 12, 1968
M. R. BLOCH
3,373,058
PRIMARY CELL COMPRISING AN AQUEOUS SOLUTION CONTAINING
HALOGEN AND A METAL HALIDE
Filed June 14, 1965
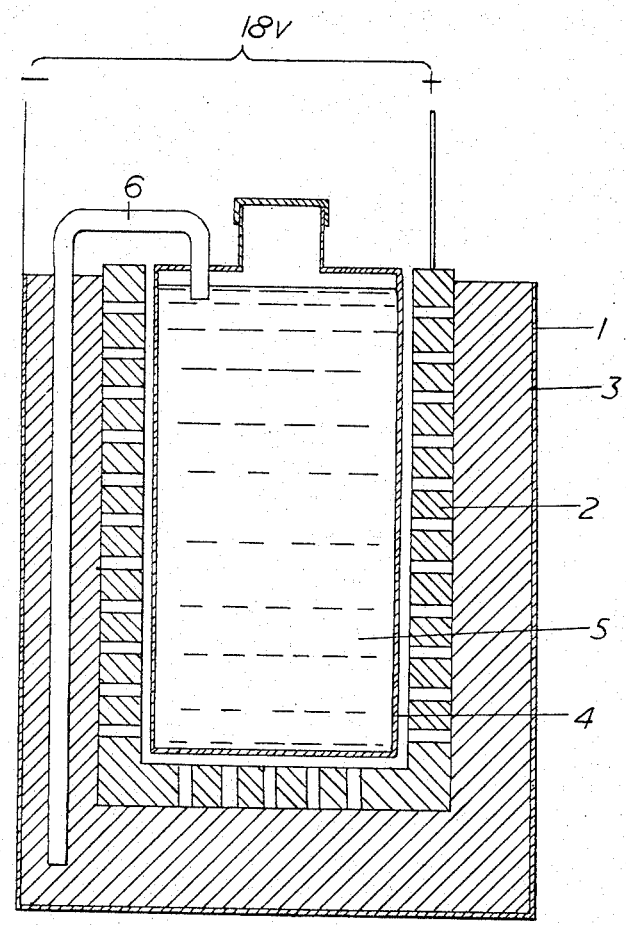
Inventor
Moshe Rudolf Bloch
By Alvin Browdy
Attorney United States Patent Office 3,373,058
Patented Mar. 12, 1968

3,373,058
PRIMARY CELL COMPRISING AN AQUEOUS SOLUTION CONTAINING HALOGEN AND A METAL HALIDE
Moshe Rudolf Bloch, Beersheba, Israel, assignor to Dead Sea Works Limited, Beersheba, Israel, an Israeli company
Filed June 14, 1965, Ser. No. 463,633
Claims priority, application Israel, June 24, 1964, 21,599
8 Claims. (Cl. 136—83)

The present invention concerns primary electrolytic cells of the kind where one electrode is Zn or Cd, the other electrode is of an inert material and the electrolyte is an aqueous solution containing elementary halogen and either Zn or Cd halide. These cells will be referred to hereinafter as "cells of the kind specified."

Primary cells of the kind specified have a relatively high potential. Thus, for example, a cell of the kind specified wherein the metal electrode is of Zn, the inert electrode is of graphite and the electrolyte is an aqueous $ZnBr_2$ solution containing elementary bromine, has a potential of 1.8 volts. In the course of operation of a cell of the kind specified, the halogen is consumed in that it is converted into Me-halide. It is consequently necessary to supply fresh elementary halogen to the electrolyte solution at the rate at which it is consumed, which has hitherto turned out to be a major difficulty. In connection with the above-mentioned $Zn/ZnBr_2$ cell it has already been proposed to solve the problem by supplying the free bromine in the form of a solid polybromide such as, for example, the tetramethylammonium chloride-bromine complex. However, this has proved not to be fully satisfactory because of the instability of the polybromide and the fact that its bromine becomes less and less available as the mass near the inert electrode is exhausted.

It is the object of the present invention to provide cells of the kind specified with a constant supply of elementary halogen to the electrolytic solution.

The invention consists in a primary cell comprising a container, an Me electrode where Me is a metal selected from the group consisting of Zn and Cd, spaced therefrom an inert electrode, an aqueous solution containing halogen and a metal halide selected from the group consisting of zinc halides and cadmium halides in contact with said electrodes, and in contact with said solution a source of at least one elementary halogen enclosed within at least one container of a material through which free halogen can diffuse.

If desired the Me electrode may form the casing.

The elementary halogen inside said container(s) may be in pure form, in form of a solution, adsorbed on a suitable solid adsorbent, a readily decomposable complex, which is capable of giving off free halogen, or quite generally in any gaseous, liquid or solid form that is capable of giving off elementary halogen, or a mixture of elementary halogens.

Examples of materials from which the halogen container may be made are polyethylene and fluorinated hydrocarbons.

It is preferred to shield the space between the halogen container and the inert electrode from the Me electrode. In a preferred embodiment of the invention this is achieved by locating the halogen container on that side of the inert electrode that is turned away from the Me electrode, and making the latter liquid-permeable. By such an arrangement the bulk of any halogen that diffuses through the halogen container wall into the solution whenever the outer circuit is closed, is converted into halide in the shielded zone and it is mainly halide ions that pass from the shielded zone to the unshielded one as a consequence of ionic migration.

A similar effect may also be achieved when the halogen container(s) is or are placed in the space between the electrodes. In this case only that wall of each container that faces the inert electrode will be made permeable for the diffusion of halogen and transversal channels for the solution through the container and/or between the containers where there are two or more containers, will have to be provided.

It is further preferred to have the distance between that wall of each halogen container that faces the inert electrode small relative to the distance between the electrodes. In this manner the bulk of the halogen delivered from the container(s) into the solution when the outer circuit is closed is converted into halide ions at a relatively large distance from the Me electrode whereby the shelf-life of the cell is improved.

If desired, the halogen container may include a mixture of two or more halogens. Where the halogen is present inside the container in form of a solution it is possible to use for the solution inert organic solvents such as carbon tetrachloride, carbon tetrabromide or other halogenated hydrocarbons. It is also possible to use as halide source an aqueous polyhalide solution such as zinc polyhalide. Where the halogen is present in the container in adsorbed form, any conventional adsorbent may be used such as silica gel, active charcoal, tetramethylammonium chloride and many others.

As the elementary halogen diffuses from the container into the electrolyte, the pressure inside the container may drop. In such a case it may be preferable to provide means for the compensation of this pressure drop. In one embodiment of the invention this is effected by means of an opening in the halogen container leading to the atmosphere, through which opening air enters the container to the extent that halogen diffuses therefrom. This solution of the problem is, however, not always practical, in particular where the halogen source is or includes elementary chlorine or bromine. Accordingly in another embodiment of the invention the inner space of the halogen container communicates through suitable ducting means with the electrolyte container so that electrolyte solution flows into the halogen container whenever the pressure therein drops.

Preferably, the aqueous Me-halide solution will be soaked on a suitable carrier such as, for example, asbestos.

The invention is illustrated, by way of example only, in the accompanying drawing which is a section through a primary cell according to the invention.

The cell here illustrated comprises a zinc casing 1 serving as negative electrode and a perforated cup-shaped graphite electrode 2 serving as positive electrode. Between electrodes 1 and 2 is sandwiched a layer 3 of asbestos soaked with an aqueous $ZnBr_2$ solution. Inside the inner space of electrode 2 is located a polyethylene container 4 filled with elementary bromine in the form of an aqueous zinc polybromide solution 5. The upper space of container 4 is linked with the bottom section of the zinc casing 1 by means of a siphon pipe 6.

When bromine is first introduced into container 4 while electrodes 1 and 2 are unconnected, the bromine will diffuse into the aqueous zinc bromide solution with which the asbestos layer 3 is soaked. If now the electrodes 1 and 2 are connected by an outer circuit the electrolytic processes will set in, during which zinc and bromine are consumed. The zinc is supplied by the zinc electrode and the bromine by diffusion from the container 4.

It has been found that a primary cell according to the invention operates as long as there is any halogen left in the container. Thus, for example, a cell of the kind described hereinbefore operating on pure bromine and zinc bromide has been running four hours daily for several months at a constant voltage of 1.7 volts and with a constant current drain of 0.17 amp.

Because of the halogen-permeability of the halogen container, some halogen will diffuse therefrom into the electrolytic solution even during the rest period at which the outer circuit is open, although to a lesser extent than during the operational period when the outer circuit is closed. The halogen reaching the solution diffuses therein towards the Me electrode which is thus consumed by the reaction $Me + Hal_2 \rightarrow MeHal_2$. The shelf-life of the cell according to the invention, although as a rule very long, is thereby limited and determined by the rate of diffusion of elementary halogen from the container to the Me electrode. This rate of diffusion depends among others on the geometry of the apparatus and is, as a rule, small, in particular where the electrolytic solution is soaked on a solid carrier.

According to one embodiment of the invention the shelf-life of the cell is improved by incorporating in the electrolytic solution an $Mn^{II}$ salt. During the rest period the $Mn^{++}$ is oxidized by the halogen into $Mn^{+++}$ which latter forms an $Mn(OH)_4$ gel which blocks the halogen container, thereby obstructing the diffusion of halogen out of the container, and also the interelectrode space thereby obstructing the diffusion of halogen inside the solution. When the outer circuit is closed, the $Mn^{+++}$ is reduced again to $Mn^{++}$. Consequently, the $Mn(OH)_4$ gel disappears and halogen can again diffuse freely from the container into the solution.

Although the invention is described hereinbefore with reference to one inert and one Me electrode, it is obvious that it also embraces cells having more than one pair of such electrodes. It, moreover, embraces batteries embodying two or more cells of the kind described.

I claim:

1. A primary cell comprising a casing, an aqueous solution containing halogen and a metal halide selected from the group of zinc halides and cadmium halides within the casing, an Me electrode where Me is a metal selected from the group consisting of zinc and cadmium and spaced therefrom an inert perforated electrode, said Me and inert electrode are both in contact with said aqueous solution, and in contact with said aqueous solution at least one halogen permeable container enclosing a source of free halogen.

2. A cell according to claim 1, wherein the space between the halogen container and the inert electrode is shielded from the Me electrode.

3. A cell according to claim 2, wherein each halogen container is located on that side of the inert electrode that is turned away from the Me electrode and the inert electrode is liquid-permeable.

4. A cell according to claim 2, wherein each halogen container is located in the space between the electrodes, only that wall of each container that faces the inert electrode being permeable to halogen diffusion, and transversal channels for the electrolyte are provided for communication between the liquid bodies on both sides of each container.

5. A cell according to claim 1, wherein the distance from that wall of each halogen container that faces the inert electrode is small relative to the distance between the electrodes.

6. A cell according to claim 1, wherein the inner space of each halogen container communicates through ducting means with said aqueous solution so that the latter flows into each container whenever the pressure therein drops.

7. A cell according to claim 1, wherein said aqueous solution contains in addition an $Mn^{II}$ salt.

8. A battery embodying at least two cells according to claim 1.

References Cited
UNITED STATES PATENTS

| | | |
|---|---|---|
| 3,328,202 | 6/1967 | Riffe. |
| 3,134,698 | 5/1964 | Neipert. |
| 3,019,279 | 1/1962 | Blue et al. |
| 2,566,114 | 8/1951 | Bloch. |

ALLEN B. CURTIS, *Primary Examiner.*

A. SKAPARS, *Assistant Examiner.*